United States Patent [19]

Buschbom

[11] Patent Number: 4,989,767
[45] Date of Patent: Feb. 5, 1991

[54] GOLF CART COOLER

[76] Inventor: Vernon D. Buschbom, 212 Delaware Dr., Ozawkie, Kans. 66070

[21] Appl. No.: 264,548

[22] Filed: Oct. 31, 1988

[51] Int. Cl.$^5$ .............................................. B60R 9/06
[52] U.S. Cl. .............................. 224/274; 224/42.45 R; 224/273; 280/769; 280/DIG. 5
[58] Field of Search .................... 224/273-275, 224/42.42, 42.45 R, 42.46 R, 30 R, 30 A, 31, 32 R, 36, 42.43, 42.03 A, 42.07; 296/37.1; 280/762, 769, DIG. 5

[56] References Cited

U.S. PATENT DOCUMENTS

| | | | |
|---|---|---|---|
| D. 187,858 | 5/1960 | Pollock | 280/DIG. 5 X |
| D. 293,851 | 1/1988 | Cannon et al. | D3/37 |
| 1,466,906 | 9/1923 | Kerr | 224/42.03 A |
| 1,897,094 | 2/1933 | Wilson | 224/42.07 |
| 1,941,375 | 5/1931 | Wildman | 224/42.43 |
| 2,009,051 | 7/1935 | King | 224/42.42 R |
| 2,401,245 | 5/1946 | Hobbs | 224/36 |
| 2,706,008 | 4/1955 | Voigt | 280/DIG. 5 X |
| 2,723,535 | 11/1955 | Jones | 224/42.46 R |
| 2,919,758 | 1/1960 | Newton et al. | 180/210 |
| 3,131,842 | 5/1964 | Dingle, Jr. et al. | 224/274 |
| 3,286,891 | 11/1966 | Jones, Jr. | 224/39 R |
| 3,903,944 | 9/1975 | Montgomery et al. | 224/32 R |
| 3,938,719 | 2/1976 | Carlton | 224/36 |
| 3,955,729 | 5/1976 | Montgomery | 224/36 |
| 4,260,085 | 4/1981 | Jefferson | 224/32 R |
| 4,376,502 | 3/1983 | Cohen | 224/42.46 R |
| 4,413,700 | 9/1981 | Shiratsuchi | 180/219 |
| 4,522,442 | 6/1985 | Takenaka | 224/42.42 |
| 4,550,930 | 11/1985 | Proffit | 280/655 |
| 4,570,732 | 2/1986 | Craven | 180/19.3 |
| 4,889,267 | 12/1989 | Bolton | 224/274 |

FOREIGN PATENT DOCUMENTS

| | | | |
|---|---|---|---|
| 0524557 | 12/1953 | Belgium | 296/37.1 |
| 1128769 | 10/1958 | Fed. Rep. of Germany | 296/37.7 |
| 1497856 | 10/1967 | France | 296/37.1 |

*Primary Examiner*—Henry J. Recla
*Assistant Examiner*—Casey Jacyna
*Attorney, Agent, or Firm*—Bruce J. Clark

[57] ABSTRACT

A cooler for releasably mounting on the front end of a motorized cart, such as golf carts. In one preferred mode, the cooler is mounted on the inside front portion of the cart and comprises a multi-sided enclosure having coplanar side walls with a shape resulting in the rear wall and bottom wall that are substantially coplanar with the cowling and floorboard respectively. A hooked plate member provides one method of securing the cooler to the cart; a toe plate at the bottom also secures it. In an alternate mode, the cooler attaches to the outside front portion of the cowling and has a bottom wall that is coplanar with the cowling while the top wall is horizontal; the cooler is attached with a planar hooked member. Both modes of the invention can utilize rubberlike or other preshaped members to place between the cooler and the cart to allow for additional universal adaptation of the coolers to various carts.

3 Claims, 3 Drawing Sheets

FIG. 8

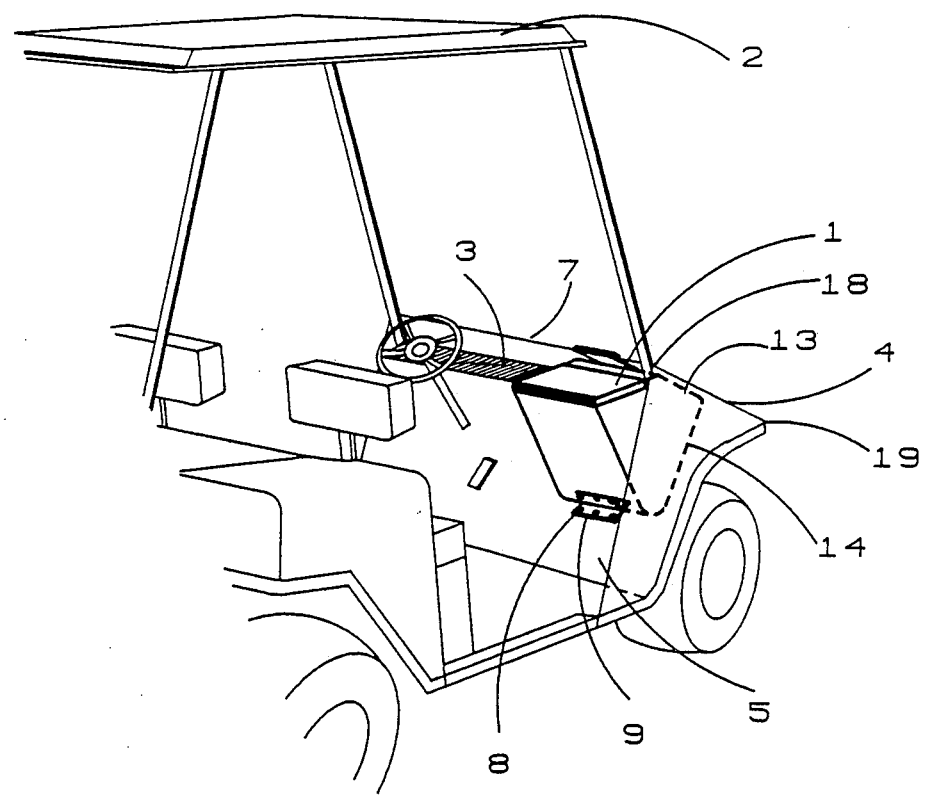
FIG. 1
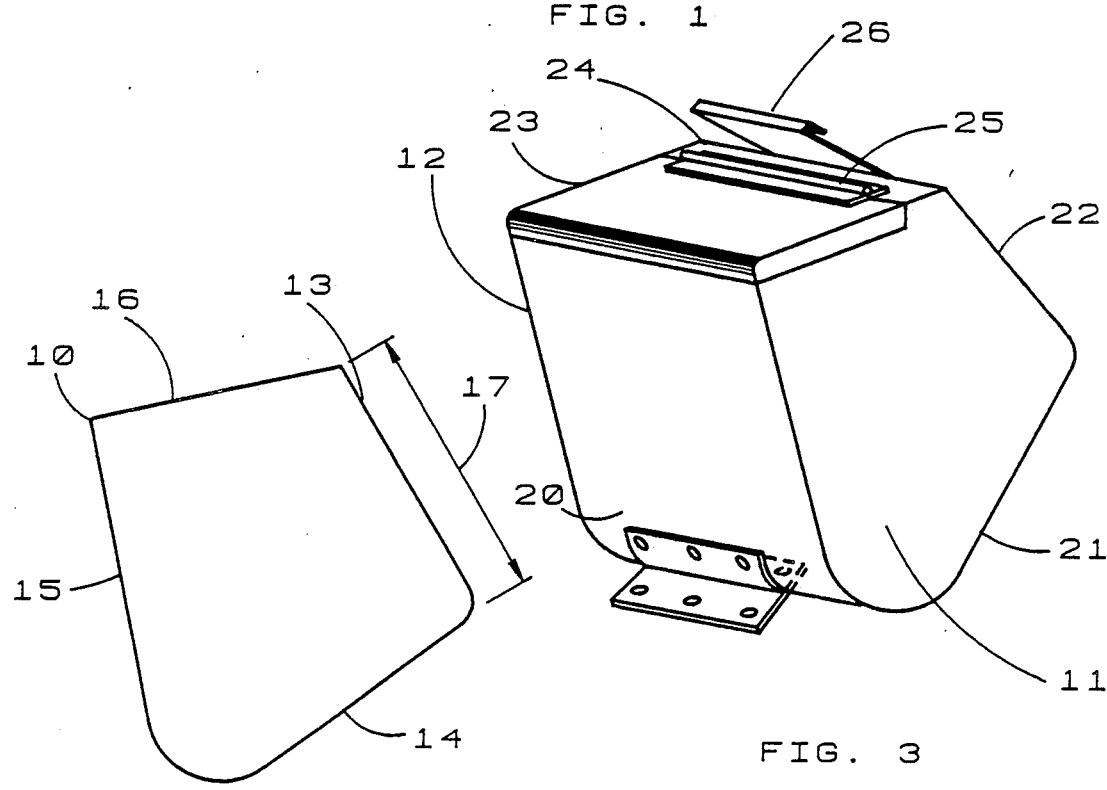
FIG. 2
FIG. 3

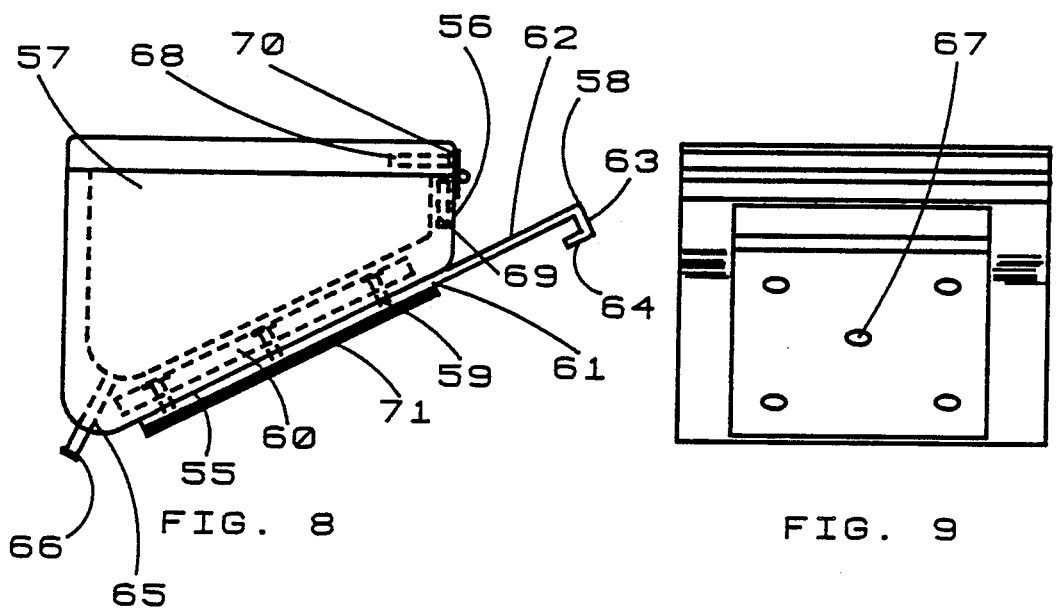
FIG. 8
FIG. 9
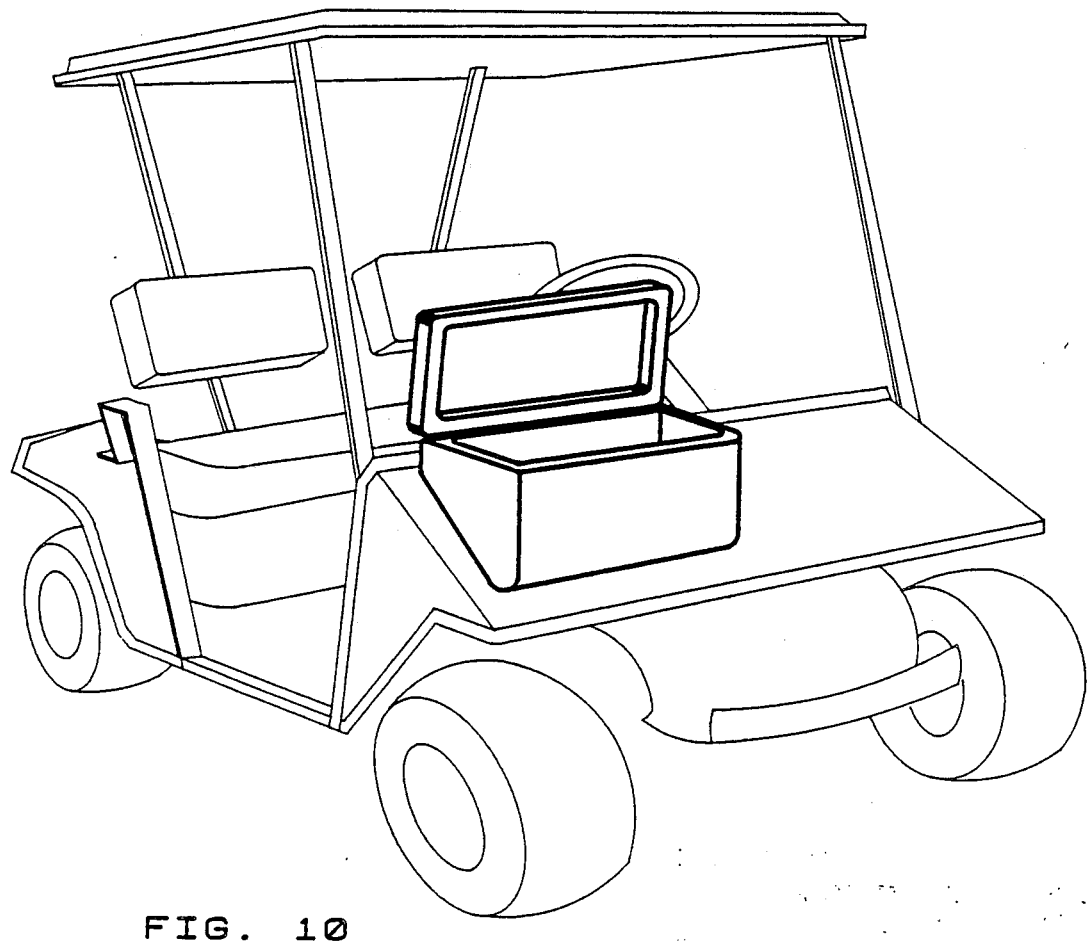
FIG. 10

GOLF CART COOLER

BACKGROUND OF THE INVENTION

This invention relates to the field of beverage and food coolers attachable to motorized golf carts or the like.

Presently golfers or others utilizing golf carts, or similar type field or motorized course carts, and needing a standard sized cooler to hold beverages, food or other refrigerated items, simply set the coolers in the back of the golf cart where or near where the golf tags or other items normally lie. Some golf carts are outfitted with a rear recessed deck for placing such things as clothes bags, coolers, etc. However, coolers take up substantial room in these areas that crowd golf bags or other articles carried along. Moreover they are insecure and unstable as the golf cart is driven around the course; moreover, being in the rear, they are more difficult for passengers to reach while sitting in the cart either while it is moving or standing still.

The only known attachable cart coolers are for storing specified types and small numbers of special items, such as that shown in Hutchins, U.S. Pat. No. 3,899,098. Hutchins discloses a cylindrical device for holding cans that is attachable to a motorized golf cart. The invention itself only holds five cans. It is cylindrical, small and does not deal with the problem of holding any items other than cans, nor does it easily hold ice. Neither is it directed towards attachment to the front portion of the golf cart.

It is therefore an object of this invention to provide a cooler of approximately standard size for holding beverages of most types and sizes and food items along with ice and other refrigerated goods, uniformly attachable to most golf carts at the front area for convenient access from the passenger seat to articles stored in the cooler. It is a further object of the invention to provide such a cooler that is of a higher capacity that is more general purposed to hold items such as cans, drinks and bottles, all of different sizes, as well as food, ice, and other refrigerated items. It is a further object of the invention to provide a cooler that is of such a design that it is attractive and aesthetically pleasing. It is a further object of the invention to provide such a cooler by utilizing space not previously utilized on the golf cart and consequently save existing storage space on the back of the golf cart for extra sets of golf clubs or other items. It is a further object of this invention to utilize such extra space so as not to substantially interfere with the passenger compartment and passenger comfort.

It is a further object of this invention to provide these aforementioned advantages and provide a cooler that remains secure on the golf cart while the golf cart is in motion at normal golf cart speeds around the golf course. It is still a further object to provide such a cooler that is releasably attachable.

Other objects and features of the invention and objectives and the manner in which the invention achieves its purpose will be appreciated from the following description and the accompanying drawings which exemplify the invention, it being understood that changes may be made in the specific apparatus disclosed herein without departing from the essentials of the invention set forth in the appended claims.

BRIEF SUMMARY OF THE INVENTION

The present invention relates to a cooler releasably attachable to the front end of most motorized golf carts, or the like, said cooler being a thermally insulated multi-sided enclosure having two oblique side walls spaced apart in a coplanar fashion and joined together at mutually opposed parallel edges by a rear wall, bottom wall, front wall, and top wall containing a hinged lid, with means to join the cooler to the cart at the rear wall and/or adjacent walls to the golf cart cowling to allow the cooler to hang from a front portion of the golf cart. Means are also included for securing the bottom of the cooler to the golf cart floorboard near the common edge between the front wall and bottom wall. In another mode of the invention the bottom wall has joined to it an elongated plate hook means for hanging the cooler on the cowling on either the inside or outside front portion of the golf cart.

BRIEF DESCRIPTION OF THE DRAWINGS

FIG. 1 is a perspective view of the device in the front inside passenger compartment mode.

FIG. 2 shows the approximate shape of the sidewalls of the cooler.

FIG. 3 is an enlarged perspective of the device shown in FIG. 1.

FIG. 8 is a side view of the cooler shown in FIG. 6.

FIG. 9 is a rear view of the cooler shown in FIG. 8.

FIG. 10 is a perspective view of the cooler shown in FIG. 6 in place on the golf cart.

DETAILED DESCRIPTION OF THE PREFERRED EMBODIMENT

Figure 4:
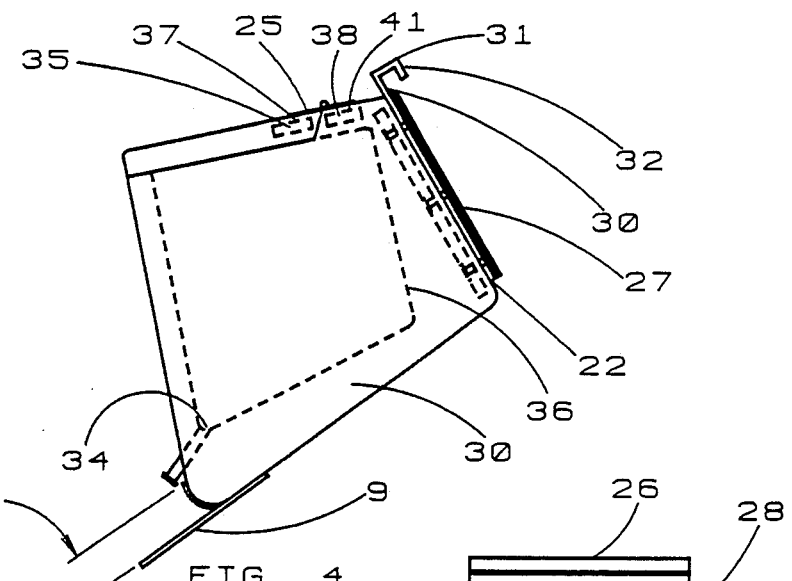
FIG. 4 is a side view of the cooler shown in FIG. 3.

Referring to FIG. 1, a preferred embodiment of the invention 1 is shown on the inside of the golf cart 2. The golf cart has a shelf 3 that has its right half cut away to allow the cart interior to receive the cooler. Most golf carts and other course carts have the cowling 4 and sloped floorboard 5 (such as the E-Z GO, MELEX CLUB CAR, and COLUMBIAN models). Some models have no shelf, and consequently alleviate the necessity of removing any portion of the shelf 3. The cooler 1 is held in place by an elongated planar hook means that allows for releasably holding the cooler over the top edge and molding 7 of the cowling 4, although any means for releasably joining the cooler to the cart front portion, said front portion comprised of the cowling 4 and floorboard 5, is envisioned as discussed later. A toe plate 9 is releasably secured to the floorboard 5 with screws 8 and prevents the cooler from sliding down or moving out from the floorboard. The toe plate can be secured to the cooler with screws or other affixing means to provide an even more secure cooler during movement of the cart.

The cooler has two ends, 11 and 12, having a shape 10 substantially as that shown in FIG. 2. It should be understood that any oblique shape is envisioned that has sides angularly related such that a rear wall edge 13 is at an angle that conforms to and approximately abuts or conforms to the underside of the cowling 4 of the cart and has a length 17 less than the width of the cowling (the width being the distance between points 18 and 19 in FIG. 1) while the bottom wall edge 14 approximately abuts the floorboard 5, and while the front wall edge 15 is approximately vertical (plus or minus 20 degrees) or slightly forwardly leaned into the cart, and the top wall edge 16 is approximately horizontal (plus or minus 20 degrees). The rear wall edge 13 is thus substantially parallel to the cowling 4 and the bottom wall edge 14 is substantially parallel to the floorboard 5. The rear wall 17 and bottom wall 21 are substantially coplanar with the cowling 4 and floorboard 5, respectively. The top wall edge, as discussed later, can be divided into two separate substantially straight but non-colinear portions resulting in the plane of the lid being different than the plane of the remainder fixed top wall portion. In this manner, the cooler can be joined to the cowling at the fixed portion of the top wall, rather than at the rear wall, where the cowling is at such a severe angle or shape that joinder at the rear wall is impractical.

The end walls 11 and 12 (FIG. 3) are spaced apart in a coplanar fashion and between them at the respective parallel edges are joined the remaining walls comprised of a front wall 20, a bottom wall 21, a rear wall 22, and a top wall shown in FIG. 4, which top wall is comprised of a lid 23 and remaining portion 24; however this top wall can be comprised entirely of a lid, or if not, can also be placed in a position not necessarily coplanar with the remaining portion 24 of the top wall as discussed earlier. The lid 23 is hinged to the fixed portion of the cooler. The hinge 25 can be built into the lid and cooler or affixed with screws or other affixing devices.

Figure 5:
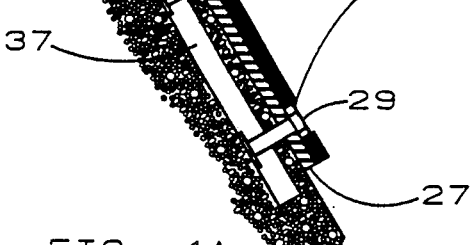
FIG. 5 is a rear view of the cooler shown in FIG. 4.

The elongated planar hook 26 is shown in FIGS. 3, 4, and 5, and has a first planar portion 27 having five holes 28 as shown in FIG. 5 for receiving therethrough the bolts 29 affixed to the cooler as discussed later. There can be any number of holes spaced at various locations, and any numerous means for affixing the hook 26 to the cooler are envisioned, including glue, building the hook 26 into the cooler, or using various screw-type arrangements. The spacing shown for the holes is the preferred method to provide the most strength with the least number of holes. The hook 26 has a second portion 30 comprised of an extension of the first portion and is in a substantially coplanar fashion, substantially here meaning that the portion 25 could be slightly out of a coplanar relationship by approximately 20 degrees. A third portion 31 extends outwardly away from the cooler and a fourth portion 32 extends back downwards and in a substantially parallel relation to the second portion, however all of these portions may be rounded to form a continuous curved hook. The size of the hook portion is dependent on the molding of the edge of the cowling 4, and is designed to fit and hook over the cowling and thus support the cooler at the front of the golf cart.

The toe plate 8 secures the bottom of the cooler to the floorboard to prevent any rotational movement of the cooler about the axis having in it the edge 7; the toe plate further gives the cooler bottom support to reduce pressure on the cowling. Although numerous means for securing the bottom of the cooler are envisioned, the toe plate here is shown as an elongated flat rigid member having an attached elongated flat curved portion with holes and outwardly extending a distance 33 for securing one portion of the member to the floorboard while the other portion is abutted and connected to the cooler. If the remaining curved portion is not to be secured to the cooler with screws or other adjoining means, it will need to outwardly extend a sufficient distance 33 to ride high enough at the bottom of the cooler to prevent the cooler from jumping over the toe plate while the cart is in motion. An elongated hinge can also be utilized instead whereby one side is affixed to the front wall and one side is secured to the floorboard, thus allowing for the operation of the hinge to account for various floorboard angles.

Shown in FIG. 4 is a channel 34 having an opening leading from the interior of the cooler to the exterior and is plugged at the exterior with a standard plug that can be of the screw-on variety, the purpose being to allow drainage of any water or liquid accumulated in the cooler. The channel can be located on any wall near the bottom of the cooler.

The walls of the cooler are of sufficient thickness to maintain strength and to allow insulation. Insulation may be simple air in the space or can be various other types of insulation available. The walls themselves are comprised of any plastic, fiberglass or other rigid material sufficient to withstand the expected heavy use. The inside wall 36 need not be planar with its matching exterior wall and as shown at the bottom, is formed at a different angle than the exterior wall to comprise a thicker wall at the bottom, not only for extra strength at the bottom, but to provide a slightly more level inside bottom surface than would be provided if the inside and outside surfaces were parallel at the bottom. The inside front and rear walls are shown as parallel to allow for easy removal of the cooler from the die during manufacture manufacturing limitations such as this may also require the top wall to be comprised entirely of the lid 23 for an inexpensive version of the cooler; however, the addition of the separate top portion 24 that is situated at an angle between the plane of the rear wall and the plane of the lid 23, provides for an additional location for securing the cooler to the cowling where the particular cowling is curved and flattens near the edge 7.

Figure 4A:
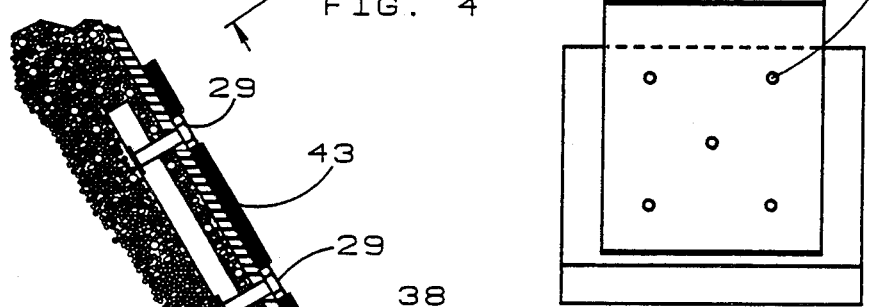
FIG. 4a is a blown-up side view of the rear wall of the cooler shown in FIG. 4.

The rear wall 22 is shown blown up in FIG. 4a to disclose one method for affixing the curved hook portion 26 to the rear wall, or in the alternative, to connect the cooler itself directly to the cowling at the rear wall with screws. Manufacture of the cooler can be done using fiberglass built up and molded around a model having the shape of the inside surface, or with plastic using many of the plastic manufacturing processes available, including injection or vacuum molding. A rigid member 37, which can be a simple piece of plywood or plastic, is affixed in the mold prior to molding the plastic or fiberglass 39 around the same. Placed in the board are bolts 29 spaced at their various locations 28 and having a length sufficient to penetrate the hook portion 27 and receive a nut 38 holding the hook 26 on the finished device. This rigid member 37 is of a size having length and width somewhat less than the length and width of the rear wall, and has a thickness sufficient to allow a substantial amount of molding material 39 (plastic or fiberglass) to surround it on all sides and secure it evenly and firmly in the rear wall. The rigid member 37 should also be of sufficient strength to withstand the expected stress of the cooler on the bolts. It should also be understood that other ways of securing this rigid member 37 and the bolts are envisioned. Washers can be included to further prevent the possibility of the bolts being pulled through the holes during heavy stress. The rubberized mat 43, discussed more later, is glued or otherwise secured to the back of the first portion 27 of the hook 26 to provide for stabilization and protection of the cowling against the bolts. The bolts may, however, be such that the nuts and end of the bolt are countersunk in the plate 22 of the hook 26. Thus the bolt ends would not protrude to scratch the cowling.

Similar type rigid members 40 and 41 are embedded in the top wall to provide for a secure basis in which to screw or otherwise secure the hinge 25. Screws 42 and 43 screw into the members 40 and 41.

It should also be understood that another equally preferred method for attaching the cooler to the cowling, rather than using the hook 26, is to provide bolts 29 of sufficient length to extend through the cowling 4 as the cooler is placed underneath the front portion of the cart, such that the bolts can extend through matching holes drilled in the cowling; nuts with washers can then be used to secure the bolts and cooler to the cowling 4. In this manner, the use of the hook is avoided, yet the cooler is still releasably attached, yet more firmly so, to the golf cart. A toe plate 8 is still used at the bottom.

FIG. 5 shows the rear view of the cooler with hook 26 and holes 28.

Figure 6:
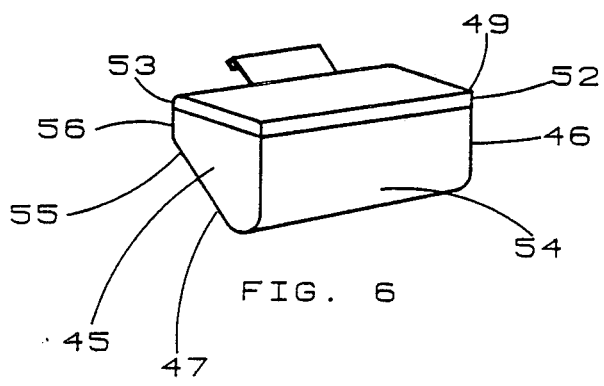
FIG. 6 is a perspective of another mode of the invention for hanging on the outside front portion of the golf cart cowling.
Figure 7:
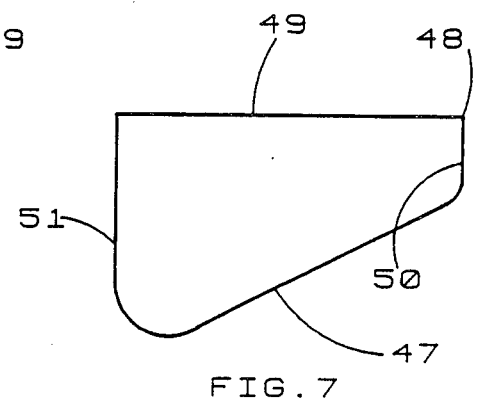
FIG. 7 shows the approximate shape of the end walls of the cooler in FIG. 6.

In another mode of the invention, the cooler shown in FIG. 6 is attached to the outside front portion of the golf cart. Its two ends 45 and 46 have substantially the shape 48 shown in FIG. 7, it being understood that the bottom wall edge 47 has an angle and slope relative to the ground substantially matching that slope of the outside portion of the cowling, 4, while allowing the top wall edge portion 49 to retain horizontal. The bottom wall edge 47 is thus parallel to the cowling 4 and the bottom wall 55 is thus coplanar with this cowling. The exact slope and size of the remaining wall edges 50 and 51 are not as crucial, but are shown preferred as that in FIG. 7. This outside cooler has the lid 52 as the top wall, hingedly connected at 53 to the remainder of the cooler, a front wall 54, a bottom wall 55, and rear wall 56, all enclosing an interior space 57. The elongated planar hook member 58 is similarly connected to the cooler as discussed earlier, through bolts 59 and rigid member 60 built into the bottom wall of the cooler. The hook 58 is shown again having a first portion 61 that is abutted to the bottom wall, a second portion 62 substantially coplanar with section 61 that extends away from the cooler, although it is understood that this section may be noncoplanar by approximately 20 degrees, and third and fourth portions, 63 and 64, that extend away from the cooler and downward, respectively. These sections 63 and 64 may also be rounded to form a curved hook. A channel member 65 is shown with a plug 66 for drainage. Again, in this mode of the invention, the cooler may be attached directly to the outside portion of the cowling through a nut and bolt assembly 59 having a sufficient length to extend through the cowling and with a nut and washer underneath the inside portion of the cowling securing the cooler thereto, thus eliminating the elongated hook portion. Holes 67 are shown in their preferred spaced apart locations in FIG. 9.

Also shown in FIG. 8 are rigid members 68 and 69 embedded in the top wall and rear wall respectively so that the screws of the hinge 70 may be secured therein.

The rubberized mat 71 serves to not only cushion the cooler and protect the cowling (as discussed earlier), but its rubberized material allows it to self adjust to contour to the shape of the cowling and the angle of the cowling, particularly when the angle and shape of the cowling and angle of the bottom wall 55 of the cooler are close but not quite identical. These firm but rubberized mats can be made available in various shapes and contours to match the contours of the various shaped and angled cowlings on the different brand carts, so that one side of the mat matches the angle and shape of the cowling and the opposing side matches the bottom wall of the cooler, while maintaining the top of the cooler in the desired horizontal or near horizontal position. Use of the various shaped mats result in even more uniformity of use of the cooler among the various brand carts. Rigid mats can also be utilized, which mats are preshaped to match the various cowlings of the different models. Rigid mats are also considered herein as self adjusting.

FIG. 10 shows the cooler attached to the outside portion of the cowling 7.

The invention shown is adaptable to most golf carts and course carts, i.e. those being the two-passenger types of carts run by electric motor or by gasoline or other fuel, most of which are operable in such a manner that ignition of the motor is commenced whenever the accelerator pedal is pushed; however, these may be adapted easily for any nonhighway moving vehicle used for work or pleasure having characteristics of the front portion of the golf cart as described.

While there have been shown and described particular embodiments of the invention, it will be obvious to those skilled in the art that changes and modifications may be made without departing from the invention or its equivalent, and, therefore, it is intended by the appended claims to cover all such changes and modifications as fall within the true spirit and scope of the invention.

I claim:

1. A cooler attachable to the front portion of a motorized golf cart having an outside front portion with a sloped cowling having an upper edge comprised of:
    a rigid multi-sided enclosure having as two of its sides two oblique substantially symmetrical end walls, said end walls each having four or more edges, each edge having a length and angularly related such that one edge, being a bottom wall edge, is substantially parallel to the cowling, while an adjacent edge comprising a front wall edge is approximately vertical or within 20 degrees thereof; a next adjacent edge, comprising a top wall edge, extends approximately horizontal or within 20 degrees thereof when the bottom wall edge is placed against or near the cowling and has a length such that the next adjacent edge, comprising a rear wall edge, which connects the top wall edge and the bottom wall edge together, is approximately vertical or within 20 degrees thereof. The said end walls are spaced apart in a substantially parallel relationship with their corresponding and mutually opposed parallel edges connected therebetween by the remaining walls comprised of a bottom wall, a front wall, a top wall, and a rear wall, respectively, said top wall or a portion thereof comprised of a lid hingedly joined to the remainder of the enclosure on one parallel edge to allow access to the interior of the enclosure;
    means for releasably securing the cooler to the cowling, wherein the securing means is comprised of an elongated hook member having three or more substantially planar portions each having two opposing ends, one of said portions being secured to the bottom wall of the cooler and connected to the remaining planar portions to create an elongated hook member extending beyond the rear wall of said cooler and is releasably attachable over the upper edge of said cowling and having leveling means for leveling the cooler while on the cowling.

2. The cooler as in claim 1 and having self-adjusting padding and leveling means situated between the cowling and the cooler for leveling the cooler and padding the cooler and cowling.

3. The cooler as in claim 1 and having self-adjusting padding and leveling means comprised of a firm rubber-like mat situated between the cooler and the cowling, the mat having a first surface having a shape generally conforming to the contour of the cowling, and said mat having a second opposing surface angularly related to the first surface such that the cooler is level when the cooler and mat are in place.

* * * * *

UNITED STATES PATENT AND TRADEMARK OFFICE
CERTIFICATE OF CORRECTION

PATENT NO. : 4,989,767

DATED : February 5, 1991

INVENTOR(S) : VERNON D. BUSCHBOM

It is certified that error appears in the above-identified patent and that said Letters Patent is hereby corrected as shown below:

In Claim 1, Column 6, Line 56, delete ". The" and substitute --;the-- therefore.

Signed and Sealed this

Sixteenth Day of March, 1993

*Attest:*

STEPHEN G. KUNIN

*Attesting Officer*  *Acting Commissioner of Patents and Trademarks*